United States Patent [19]
Krueger et al.

[11] Patent Number: 5,127,017
[45] Date of Patent: Jun. 30, 1992

[54] ELECTRICALLY EXCITED STRIPLINE LASER

[75] Inventors: Hans Krueger, Munich; Hubert Weber, Augsburg, both of Fed. Rep. of Germany

[73] Assignee: Siemens Aktiengesellschaft, Munich, Fed. Rep. of Germany

[21] Appl. No.: 661,220

[22] Filed: Feb. 27, 1991

[30] Foreign Application Priority Data

Mar. 29, 1990 [DE] Fed. Rep. of Germany .... 4010147.9

[51] Int. Cl.⁵ .............................................. H01S 3/03
[52] U.S. Cl. ................................................ 372/61
[58] Field of Search ................. 372/61, 82, 87, 98, 372/103

[56] References Cited

U.S. PATENT DOCUMENTS 4,890,294 12/1989 Nichimie et al. .................... 372/82
4,908,585 3/1990 Chenausky ......................... 372/82

Primary Examiner—John D. Lee
Assistant Examiner—Robert E. Wise
Attorney, Agent, or Firm—Hill, Van Santen, Steadman & Simpson

[57] ABSTRACT

Electrically excited stripline laser. In stripline lasers having high power density, a structure is provided wherein the resonator mirrors directly adjoin the stripline. An electrically insulating layer that has good waveguiding properties for the desired laser emission is arranged at least between a mirror and an excitation electrode. The stripline laser is suitable for stripline lasers having a high specific power.

22 Claims, 1 Drawing Sheet

ELECTRICALLY EXCITED STRIPLINE LASER

BACKGROUND OF THE INVENTION

The present invention is directed to an electrically excited stripline laser of the type having two waveguide surfaces, two resonator mirrors and at least two discharge electrodes, the electrodes being positioned opposite one another with reference to a beam direction. Waveguiding surfaces extend up to the resonator mirrors and are composed of electrically non-conductive and of metallic subsurfaces. Such a laser is disclosed by German Published Application 37 29 053. In this reference a waveguide of insulating material has its outside coated with electrodes. Additional metal layers for improving the waveguiding capability can be arranged in the discharge gap. These layers can be divided into areas between which are located metal-free, electrically insulating strips.

SUMMARY OF THE INVENTION

It is an object of the present invention to provide an increase in the specific power of such a laser. What is referred to as specific power is the power per unit of discharge volume. In a laser of this type, this object is achieved by one of the stripline surfaces being composed of an electrode and at least one insulator part adjacent thereto in the beam direction and a second electrode overlaps the insulator part in the beam direction. The insulator part is composed of a material having advantageous, waveguiding properties for the laser emission.

The insulator part which is between the electrode and the mirror provides an increase of the laser power both for metal mirrors as well as for electrically non-conductive mirrors. This is based on the fact that no plasma arises in the region of the insulator part. As a result, arc-overs onto the mirror are avoided for metal mirrors and damage due to the plasma is suppressed for insulator mirrors. In particular, a reduction in the reflectivity of the mirror is avoided.

As a result of the present invention, insulating and plasma-stable but relatively expensive mirror materials such as, for example, gallium-arsenide, silicon, germanium can be forgone. Easily cooled and high-temperature-resistant mirrors, for example metals, and in particular copper, can be utilized instead. This is particularly required for high laser powers since even extremely slight losses at the mirror produce a noticeable heating and, thus, a deformation or destruction of the mirror.

The insulator part advantageously has its waveguiding capability matched to that of the electrode material. In a further embodiment, the materials of the electrode and of the insulator part are matched to one another in terms of their coefficients of thermal expansion and the insulator part has a side facing toward the discharge channel provided with a layer having advantageous waveguide properties.

The following pairings of materials for the metal-electrode/insulator part have proven especially suitable:

metal/ceramic
aluminum/$Al_2O_3$ glass
copper/$Al_2O_3$ glass
steel/forsterite
vacon/glass In terms of waveguide behavior, these materials mate well with one another, resulting in nearly loss-free waveguides. The material pairings of steel/forsterite and vacon/glass are also significantly matched to one another in terms of temperature coefficients. The electrode and the insulator part are thereby initially mechanically attached to one another such that a smooth waveguide surface results. This is also advantageous when the insulator part is composed of a material having a relatively low dielectric constant. A favorable field distribution thereby results at that end of the part of the discharge space that is filled by plasma given an insulator part that is short relative to the beam direction of the laser beam.

A simple, adequately coolable and plasma-stable embodiment is established in that one electrode fills the entire distance between the resonator mirrors, in that this electrode is electrically connected to ground, as well as galvanically and thermally connected to both mirrors, in that only this electrode contains coolant channels and in that the oppositely positioned electrode is connected to the resonator mirrors at both sides via insulator parts. At this location the plasma is kept away from the mirror. The grounded electrode also provides a stable structure and avoids all problems due to a voltage difference occurring between the coolant line and the electrode.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

Figure 1:
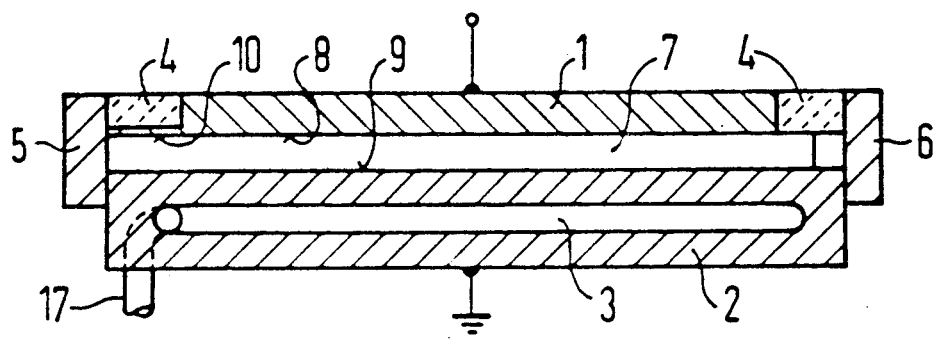
FIG. 1 is a schematic section view through the stripline laser of the present invention as depicted in FIG. 2.
Figure 2:
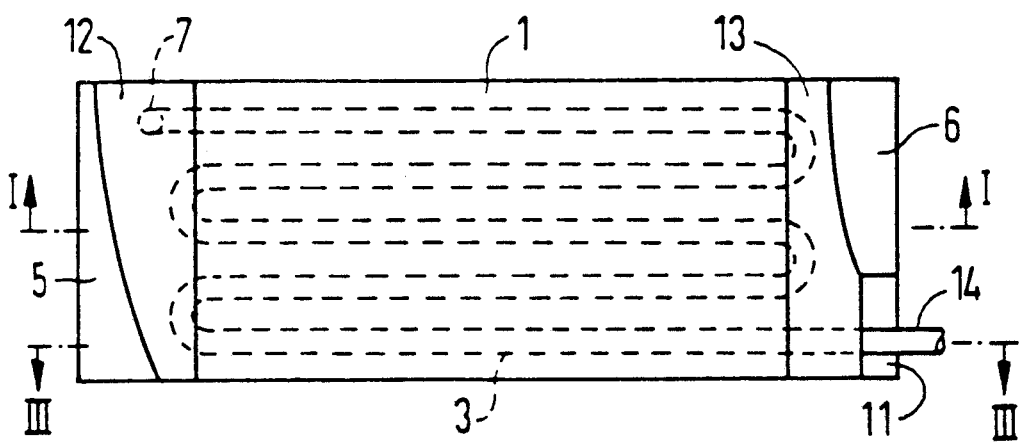
FIG. 2 is a schematic plan view of the stripline laser.
Figure 3:
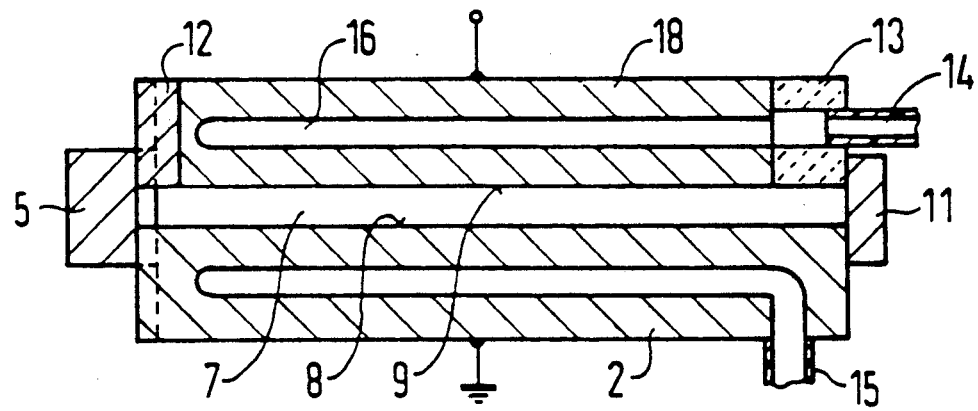
FIG. 3 is another schematic section view through the stripline laser of the present invention as depicted in FIG. 2.

The present invention has general applicability, but is most advantageously utilized in a stripline laser as depicted in FIGS. 1-3.

In a stripline laser of the present invention, the electrodes 1 and 2 are positioned opposite one another with reference to a discharge gap 7. An insulator part 4 adjoins the electrode 1 at both sides and respective mirrors 5 and 6 also adjoin this insulator part 4. The opposite electrode 2 is directly adjacent the mirrors 5 and 6. The electrode 1 and the insulator parts 4 form in common a waveguide surface 8. To this end, the insulator parts 4 are coated with a layer 10 of highly wave-guiding material, whereby the waveguide properties of the layer 10 are matched to those of the electrode 1. The electrode 1 and the layer 10 are smoothed in common after the electrode 1 is assembled with the insulator parts 4, for example, by lapping and/or polishing, resulting in a waveguide surface having high quality and without discontinuities in the waveguiding properties. Losses are thus kept low and local overheating and destruction of the waveguiding surface at the transition from one material to the other is avoided.

The performance capability of the described arrangement is especially high since, first, the mirrors are directly adjacent to the waveguide so that scatterings and losses due to the divergence of the laser light are suppressed and since, second, neither arc-overs from the electrode 1 onto the mirrors 5, 6 nor damage to the mirrors 5, 6 due to the plasma are possible. When a mirror 5, 6 is manufactured of a plasma-insensitive insulator, for example of GaAs, Si or Ge, then the corresponding insulator part 4 can be omitted and the electrode 1 can extend up to the mirror. These materials are expensive. For higher loads, it is generally recommendable to utilize a structure having insulator parts 4, 12, 13, as likewise shown in FIGS. 2 and 3. In this example, a grounded and cooled electrode 2 is utilized. The second electrode 18 here is offset from the mirrors 5, 6 at both sides with insulator parts 12, 13. The electrode 18 contains at least one cooling channel 16 to which is connected a tube 14. Water can be used as the coolant, as well as, other materials.

The electrode 2 is connected to ground and contains cooling channels 3 having at least two locations that discharge into coolant lines 15, 17. The waveguiding surface 9, formed by the electrode 2, is continuous from mirror to mirror. A good cooling over the entire length of the discharge gap thus results and is adequate for higher laser powers, particularly for low gap thicknesses of the discharge gap 7. The mirrors 5, 6 are galvanically connected to the electrode 2.

The insulator parts 4 or, respectively 12, 13 are dimensioned such that an arc-over to the mirror 5, 6 is not possible at any location, and such that the plasma in the region of the insulator parts 4, 12, 13 ends before reaching the mirror 5, 6 due to the field distribution or at least drops off to a non-critical low level. In the region of the insulator parts 4, 12, 13, the plasma is discharged toward the electrode, arcs from the plasma being drawn onto the electrode 2 and the mirrors 5, 6 remaining undamaged.

In the embodiment depicted in FIG. 2 the mirror 5 is concavely arced, the mirror 6 is convexly arced and the mirrors 5, 6 form an unstable resonator. A window 11 represents the beam exit.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. An electrically excited stripline laser having two waveguide surfaces, two resonator mirrors and at least first and second discharge electrodes, the discharge electrodes positioned opposite one another with reference to a beam direction and the two waveguiding surfaces extending to the two resonator mirrors and composed of electrically non-conductive and of metallic sub-surfaces, comprising one of the two waveguide surfaces being composed of the first discharge electrode and of at least one insulator part adjacent thereto in the beam direction.

2. The stripline laser according to claim 1, wherein the resonator mirror that adjoins the insulator part is composed of metal.

3. The stripline laser according to claim 2, wherein the metal of the resonator mirror is copper.

4. The stripline laser according to claim 1, wherein the resonator mirror that adjoins the insulator part is an electrically insulating mirror.

5. The stripline laser according to claim 1, wherein a material of the first discharge electrode and a material of the insulator part have coefficients of thermal expansion matched to one another; wherein a discharge channel is formed by at least the first and second discharge electrodes; and wherein the insulator part has a side that faces toward the discharge channel and that is provided with a layer of waveguiding material.

6. The stripline laser according to claim 1, wherein a material of the first discharge electrode is matched to a material of the insulator part and wherein the matching of the material of the first discharge electrode to the material of insulator part are selected from the following pairs of materials for first discharge electrode/insulator part:
   metal/ceramic
   aluminum/Al$_2$O$_3$ glass;
   copper/Al$_2$O$_3$ glass;
   steel/forsterite; and
   vacon/glass.

7. The stripline laser according to claim 1, wherein one electrode of the first and second electrodes fills the entire distance between the two resonator mirrors; wherein the one electrode is electrically connected to ground and galvanically conductively connected to the two mirrors; wherein only the one electrode contains at least one coolant channel; and wherein the other electrode of the first and second electrodes is joined to the two resonator mirrors at both sides via first and second insulator parts.

8. An electrically excited stripline laser comprising: a first discharge electrode positioned opposite a second discharge electrode with reference to a beam direction; first and second opposed resonator mirrors; two waveguiding surfaces extending between the first and second resonant mirrors; one of the waveguide surfaces composed of the first discharge electrode and of at least one insulator part adjacent thereto in the beam direction; the second discharge electrode overlapping the insulator part in the beam direction.

9. The stripline laser according to claim 8, wherein the resonator mirror that adjoins the insulator part is composed of metal.

10. The stripline laser according to claim 9, wherein the metal of the resonator mirror is copper.

11. The stripline laser according to claim 8, wherein the resonator mirror that adjoins the insulator part is an electrically insulating mirror.

12. The stripline laser according to claim 8, wherein a material of the first discharge electrode and a material of the insulator part have coefficients of thermal expansion matched to one another; wherein a discharge channel is formed by at least the first and second discharge electrodes; and wherein the insulator part has a side that faces toward the discharge channel and that is provided with a layer of waveguiding material.

13. The stripline laser according to claim 8, wherein a material of the first discharge electrode is matched to a material of the insulator part and wherein the matching of the material of the first discharge electrode to the material of the insulator part are selected from the following pairs of materials for first discharge electrode/insulator part:
   metal/ceramic;
   aluminum/Al$_2$O$_3$ glass;

copper/Al$_2$O$_3$ glass;
steel/forsterite; and
vacon/glass.

14. The stripline laser according to claim 8, wherein the second discharge electrode fills the entire distance between the first and second opposed resonator mirrors; wherein the second discharge electrode is electrically connected to ground and galvanically conductively connected to the first and second opposed mirrors; wherein only the second discharge electrode contains at least one coolant channel; and wherein the first discharge electrode is joined to the first and second opposed resonator mirrors at both sides via first and second insulator parts.

15. The stripline laser according to claim 8, wherein the first and second resonator mirrors are composed of electrically non-conductive subsurfaces.

16. The stripline laser according to claim 8, wherein the first and second resonator mirrors are composed of metallic subsurfaces.

17. An electrically excited stripline laser having two waveguide surfaces, two resonator mirrors and at least first and second discharge electrodes, the discharge electrodes positioned opposite one another with reference to a beam direction and the two waveguiding surfaces extending to the two resonator mirrors and composed of electrically non-conductive and of metallic subsurfaces, comprising one of the two waveguide surfaces being composed of the first discharge electrode and of at least one insulator part adjacent thereto in the beam direction; the second discharge electrode overlapping the at least one insulator part in the beam direction; and the first discharge electrode being composed of a predetermined first waveguiding material and the at least one insulator part being composed of a predetermined second waveguiding material, the predetermined first and second waveguiding materials of the first discharge electrode and the at least one insulator part being matched to provide a substantially loss-free waveguide.

18. The stripline laser according to claim 17, wherein the matching of the first waveguiding material of the first discharge electrode to the second waveguiding material of insulator part are selected from the following pairs of materials for first discharge electrode/insulator part:
   metal/ceramic;
   aluminum/Al$_2$O$_3$ glass;
   copper/Al$_2$O$_3$ glass;
   steel/forsterite; and
   vacon/glass.

19. The stripline laser according to claim 17, wherein one electrode of the first and second electrodes fills the entire distance between the two resonator mirrors; wherein the one electrode is electrically connected to ground and galvanically conductively connected to the two mirrors; wherein only the one electrode contains at least one coolant channel; and wherein the other electrode of the first and second electrodes is joined to the two resonator mirrors at both sides via first and second insulator parts.

20. An electrically excited stripline laser comprising: a first discharge electrode positioned opposite a second discharge electrode with reference to a beam direction; first and second opposed resonator mirrors; two waveguiding surfaces extending between the first and second resonant mirrors; one of the waveguide surfaces composed of the first discharge electrode and of at least one insulator part adjacent thereto in the beam direction; the second discharge electrode overlapping the insulator part in the beam direction; and the first discharge electrode being composed of a predetermined first waveguiding material and the at least one insulator part being composed of a predetermined second waveguiding material, the predetermined first and second waveguiding materials of the first discharge electrode and the at least one insulator part being matched to provide a substantially loss-free waveguide.

21. The stripline laser according to claim 20, wherein the matching of the first waveguiding material of the first discharge electrode to the second waveguiding material of the insulator part are selected from the following pairs of materials for first discharge electrode/insulator part:
   metal/ceramic;
   aluminum/Al$_2$O$_3$ glass;
   copper/Al$_2$O$_3$ glass;
   steel/forsterite; and
   vacon/glass.

22. The stripline laser according to claim 20, wherein the second discharge electrode fills the entire distance between the first and second opposed resonator mirrors; wherein the second discharge electrode is electrically connected to ground and galvanically conductively connected to the first and second opposed mirrors; wherein only the second discharge electrode contains at least one coolant channel; and wherein the first discharge electrode is joined to the first and second opposed resonator mirrors at both sides via first and second insulator parts.

* * * * *